United States Patent [19]

Sasaki

[11] Patent Number: 4,897,121

[45] Date of Patent: Jan. 30, 1990

[54] REMOVAL PROCESS OF ASBESTOS-FILLED LININGS OR COATINGS

[75] Inventor: Torao Sasaki, Kita 1-5-17, Kuki, Japan

[73] Assignees: Torao Sasaki; Noshiro Mfg. Co., Ltd., both of Kuki, Japan; a part interest

[21] Appl. No.: 183,059

[22] Filed: Apr. 19, 1988

[30] Foreign Application Priority Data

Oct. 5, 1987 [JP] Japan .................................. 62-249690
Feb. 3, 1988 [JP] Japan .................................. 63-22091

[51] Int. Cl.$^4$ ................................................. B08B 1/00
[52] U.S. Cl. .................................... 134/22.18; 134/34; 241/25
[58] Field of Search .................. 134/22.18, 24, 34, 37; 241/4, 15, 25, 30

[56] References Cited

U.S. PATENT DOCUMENTS

| | | | |
|---|---|---|---|
| 2,605,091 | 7/1952 | Socke | 134/22.18 X |
| 3,147,767 | 9/1964 | Goss | 134/22.18 X |
| 3,364,067 | 1/1968 | Piscitello et al. | 134/22.18 |
| 4,018,623 | 4/1977 | Walker | 134/24 X |
| 4,165,993 | 8/1979 | McCarthy et al. | 134/24 X |
| 4,555,872 | 12/1985 | Yie | 51/319 X |
| 4,678,493 | 7/1987 | Roberts et al. | 501/32 X |
| 4,705,429 | 11/1987 | Natale | 423/DIG. 18 X |
| 4,768,709 | 9/1988 | Yie | 57/438 X |
| 4,773,357 | 9/1988 | Scharton et al. | 134/22.18 X |
| 4,774,974 | 10/1988 | Teter | 134/24 X |

Primary Examiner—Patrick P. Garvin
Assistant Examiner—George R. Fourson
Attorney, Agent, or Firm—Oblon, Spivak, McClelland, Maier & Neustadt

[57] ABSTRACT

A process is described for the removal of an asbestos-filled lining or coating applied on a surface of a building. According to the process, high-pressure water is jetted out against the lining or coating while mechanically rubbing the lining or coating, thereby separating the lining or coating as fragments from the surface. The fragments are drawn together with the surrounding air and are then collected by means of a dust collector. Also described is a water jet device suitable for use in the removal of an asbestos-filled lining or coating. The device includes at least one rotary shredding blade to be driven by a motor in use, at least one water jet nozzle provided near the center of rotation of the blade, a cylinder surrounding the blade and nozzle in such a way that high pressure water is jetted out from the nozzle against the lining or coating and the blade is brought into frictional contact with the lining or coating, whereby the lining or coating is separated as fragments, and an exhaust pipe connected to the cylinder.

3 Claims, 6 Drawing Sheets

REMOVAL PROCESS OF ASBESTOS-FILLED LININGS OR COATINGS

BACKGROUND OF THE INVENTION (1) Field of the Invention

This invention relates to a process for the removal of asbestos filled linings or coatings, and more specifically to a process useful for removing old asbestos-filled linings or coatings applied on ceilings, side walls or outer walls or outer walls of various buildings and the like without impairing the health of workers and causing environmental pollution. The present invention is also concerned with a water jet device suitable for use in the practice of the above process.

(2) Description of the Related Art

The severe health hazard of asbestos has become a great public concern. Asbestos has also been used in a large volume as an additive for conventional spray coating compositions. It has been employed widely for finishing the interiors of schools, hospitals and many other buildings.

The carcinogenicity of asbestos has however been discovered in recent years. In addition, asbestos has started scattering and floating from old asbestos-filled linings or coatings due to their deterioration. It is hence required to remove such asbestos-filled linings or coatings and to apply asbestos-free linings or coatings in many buildings such as schools.

A great deal of asbestos dust is caused to scatter into the air upon removal of such linings or coatings. An extremely strict standard is therefore required for their removal so as to protect workers from the hazardous substance and also to prevent the environmental pollution of the surrounding atmosphere.

Dust-protective working wear having perfect airtightness is used to protect workers upon conducting the removal of asbestos-filled linings or coatings. It is also required to completely shut off the work area, for example, the windows and access openings of a building under work from the external atmosphere in order to prevent the environmental pollution.

As a method for peeling off asbestos-filled linings or coatings, metal knives or like tools have heretofore been used. This method is however accompanied by the following drawbacks. Namely, it requires scaffolding where asbestos-filled linings or coatings are located on high places such as ceilings and walls. Since it is indispensable to peel off the asbestos-filled linings or coatings completely, the work is very tough and its efficiency is very low.

There is hence an outstanding demand for the development of a method or process which permits easy and complete removal of asbestos-filled linings or coatings without pollution of the workers and surrounding environment. There is also another demand for the development of an apparatus or device which may be used for the above-mentioned purpose.

SUMMARY OF THE INVENTION

An object of this invention is therefore to provide a process for permitting easy and complete removal of an asbestos-filled lining or coating while protecting the workers and surrounding environment from asbestos.

Another object of this invention is to provide a device useful in practicing the above-mentioned process.

In one aspect of this invention, there is thus provided a process for the removal of an asbestos-filled lining or coating applied on a surface of a building, which comprises the following consecutive steps:

jetting out high-pressure water against the lining or coating and at the same time mechanically rubbing the lining or coating, thereby separating the lining or coating as fragments from the surface;

drawing the fragments together with the surrounding air; and collecting the thus-drawn fragments by means of a dust collector.

In another aspect of this invention, there is also provided a water jet device suitable for use in the removal of an asbestos-filled lining or coating, comprising:

at least one rotary shredding blade to be driven by a motor in use;

at least one water jet nozzle provided near the center of rotation of the rotary shredding blade;

a cylinder surrounding the rotary shredding blade and water jet nozzle in such a way that high pressure water is jetted out from the water jet nozzle against the lining or coating and the rotary shredding blade is brought into frictional contact with the lining or coating, whereby the lining or coating is separated as fragments; and an exhaust pipe connected to the cylinder.

According to the present invention, an asbestos-filled lining or coating is removed by jetting out high-pressure water against an area of the lining or coating and at the same time mechanically rubbing the area of the lining or coating. The asbestos-filled lining or coating thus removed in the form of fragments is then drawn together with the surrounding air, followed by its collection by a dust collector. Those containing asbestos, such as water employed and fragments of the lining or coating, are not caused to scatter around at all. The workers and surrounding environment are therefore protected from pollution.

The present invention therefore allows to remove an asbestos-filled lining or coating easily without polluting the workers and surrounding environment, no matter whether the lining or coating is applied on a ceiling or side wall. Moreover, the above work does not require hard labor.

BRIEF DESCRIPTION OF THE DRAWINGS

The above and other objects, features and advantages of the present invention will become apparent from the following description of the invention and the appended claims, taken in conjunction with the accompanying drawings, in which:

DESCRIPTION OF THE EMBOSIMENTS

Figure 1:
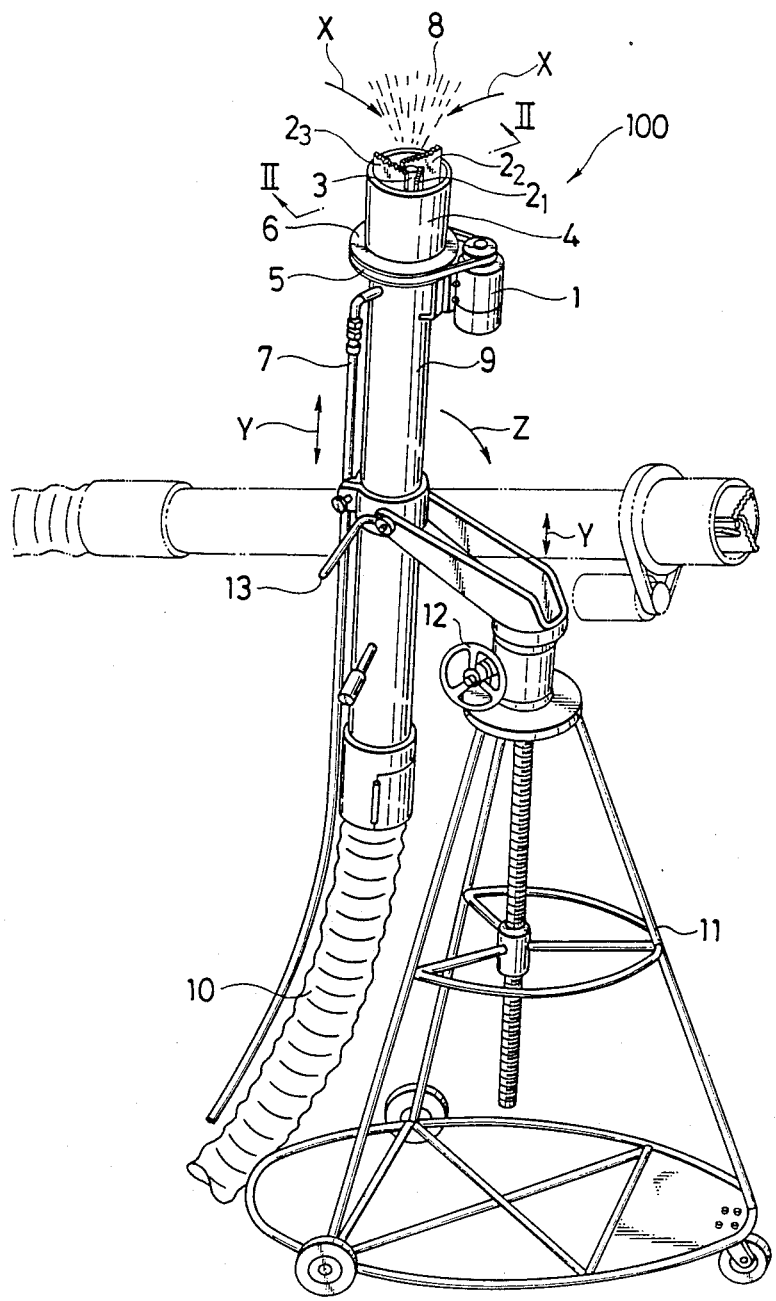
FIG. 1 is an overall schematic illustration of a water jet device according to a first embodiment of this invention.
Figure 2:
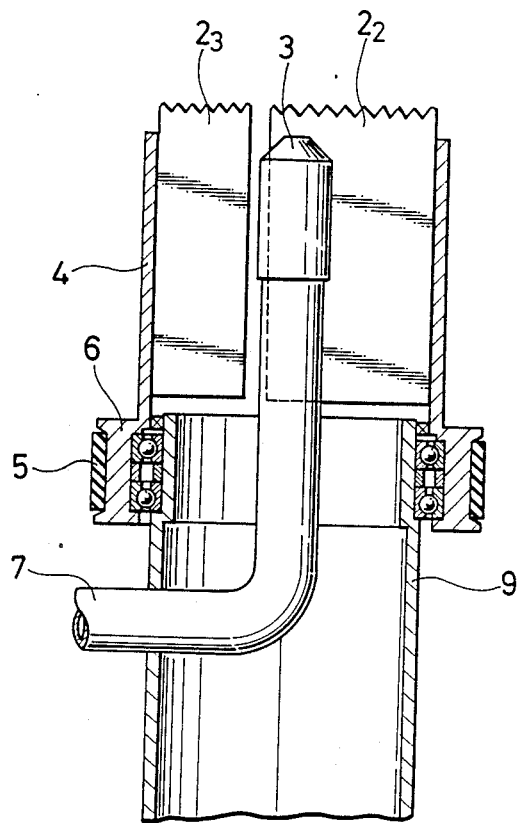
FIG. 2 is a cross-sectional view taken along line II—II of FIG. 1.
Figure 3:
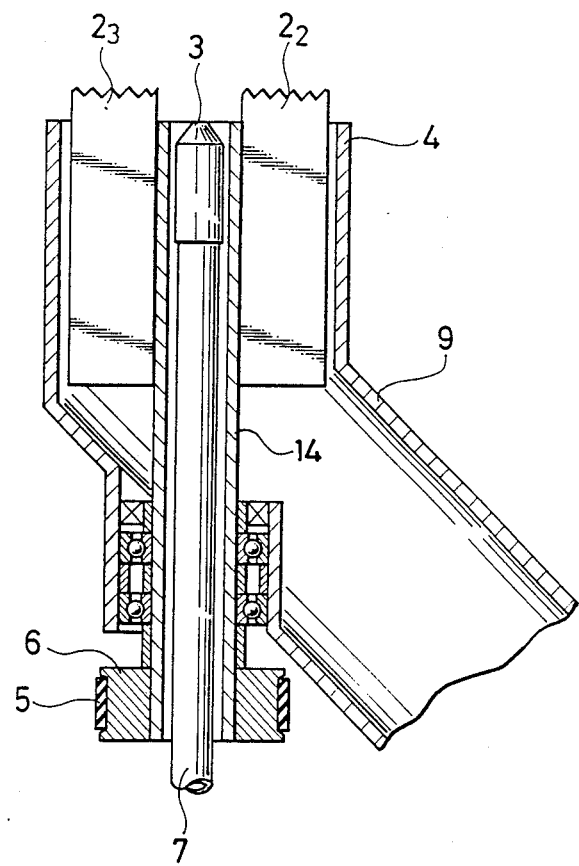
FIG. 3 is a fragmentary cross-sectional view of a water jet device according to a second embodiment of this invention.

Referring first to FIGS. 1 through 3, the water jet device according to the first embodiment of this invention is described. The water jet device is useful for the practice of the process of this invention and is designated generally by numeral 100 in these drawings. The water jet device 100 is equipped with three rotary shredding blades $2_1,2_2,2_3$ to be driven by a motor 1, a water jet nozzle 3 provided near the center of rotation of the blades $2_1,2_2,2_3$, a cylinder 4 surrounding the blades $2_1,2_2,2_3$ and water jet nozzle 3, and an exhaust pipe 9 connected to the cylinder 4.

The rotary shredding blades $2_1,2_2,2_3$ are fixed on the inner wall of the cylinder 4 and are driven at a high revolutionary speed by the motor 1 by way of a belt 5 applied to a pulley 6 which is secured on the cylinder 4. The water jet nozzle 3 is fed with high-pressure water from a water jet pump 21 (see FIG. 4) via a hose 7 connected to the nozzle 3, so that water of about 50–200 atm by way of example is jetted out from the tip of the nozzle 3. Assuming that a ceiling of a building is covered with an asbestos-filled lining or coating when the nozzle 3 and rotary shredding blades $2_1,2_2,2_3$ are brought close to the ceiling of the building while jetting out the high-pressure water through the nozzle 3, a large majority of the asbestos-filled lining or coating is peeled off by a water jet 8.

The rotary shredding blades $2_1,2_2,2_3$ are then brought into contact with any remaining parts of the lining or coating, whereby they are shredded and removed in their entirety by shredding forces of the blades. The cylinder 4 is connected at the lower extremity thereof to the exhaust pipe 9 and a flexible hose 10 is in turn connected to the lower extremity of the exhaust pipe 9. The flexible hose 10 then terminates in a vacuum pump 22 of a second dust collector 300 (see FIG. 4). Air is therefore drawn and exhausted under a strong force through the cylinder 4, exhaust pipe 9 and flexible hose 10 by the vacuum pump 22. As a result, fragments of the lining or coating shredded by the water jet 8 and the rotary shredding blades $2_1,2_2,2_3$ are drawn in their entirety along with the surrounding air into the cylinder 4. They are then fed to one of cyclones 23 of a first dust collector 200 (see FIG. 4) by way of the exhaust pipe 9 and flexible hose 10.

The principal part of the water jet device 100 useful in the practice of this invention has been described above. In a still preferred embodiment, a castered stand 11 may be provided as depicted in FIG. 1 so that the movement of the water jet device 100 is facilitated and the work efficiency is improved. Where the height of the ceiling changes, the water jet device 100 can be raised or lowered, as shown by arrow Y, by turning a handwheel 12 provided with the castered stand 11. When the water jet device 100 is used for a side wall, the work can be performed in the same manner as described above provided that a handlever 13 is loosened and the water jet device 100 is turned as indicated by arrow Z to a position shown by a phantom. Needless to say, such a castered stand is unnecessary when the water jet device is small. In such a case, the water jet device can be used as a portable water jet device.

In the above-described embodiment, the horse power of the motor 1 may range, for example, from about 0.5 hp to about 10 hp so that the rotary shredding blades $2_1,2_2,2_3$ can be rotated while pressing the water jet device against a ceiling or wall.

The rotary shredding blades $2_1,2_2,2_3$ may preferably have a sharp cutting edge so that their edges can peel off linings or coatings well. Needless to say, it is not absolutely necessary to form their edges sharp. When a lining or coating on a relatively soft surface such as wooden surface is removed by way of example, softer means such as wire brushes may of course be used instead of such sharp blades so as to protect the surface from damages. Although three rotary shredding blades $2_1,2_2,2_3$ are provided in the first embodiment, it is not essential to use three blades. One or two, or even four or more blades may be used. No particular limitation is imposed on the number of blades.

It is possible to shape the orifice of the water jet nozzle 2 in various ways so that the water jet 8 may be varied.

The cylinder 4 may preferably be made of a metal where the rotary shredding blades $2_1,2_2,2_3$ are secured thereon. It is however unnecessary to fix the rotary shredding blades $2_1,2_2,2_3$ on the cylinder 4 in the second embodiment depicted in FIG. 3, in which the blade $2_1$ is not seen. The cylinder 4 may therefore be made of a plastic material such as hard polyvinyl chloride resin. The diameter of the cylinder 4 varies depending on the size of the rotary shredding blades $2_1,2_2,2_3$ A size corresponding to the diameter of rotation of the rotary shredding blades $2_1,2_2,2_3$, for example, a diameter in a range of about 5 cm—about 50 cm is usual. Although not shown in the drawings, the cylinder 4 may be flared toward its free end so as to define a funnel-like shape. The shape of the cylinder 4 may also be brought into conformity with the shape of the rotary shredding blades $2_1,2_2,2_3$. It is only required for the cylinder 4 to have a cylindrical shape in a region where the rotary shredding blades $2_1,2_2,2_3$ rotate. Below the region, the cylinder 4 may have a different shape.

As already described above, the rotary shredding blades $2_1,2_2,2_3$ are not fixed on the cylinder 4 in the second embodiment depicted in FIG. 3. The blades $2_1, 2_2,2_3$ are fixed on a hollow rotary shaft 14 which surrounds the water jet nozzle 3. The blades $2_1,2_2,2_3$ can therefore be rotated by the motor 1 by way of the pulley 6, which is provided on an opposite end portion of the hollow rotary shaft 14, and the belt 5. The water jet device of the second embodiment operates in the same manner as the water jet device of the first embodiment except for the above-described feature.

Although the removal work of asbestos-filled linings or coatings by such a device as described above is much safer than conventional methods or processes, it is still preferable for workers to wear dust protective glasses and a dust protective mask or dust-protective working wear.

Figure 4:
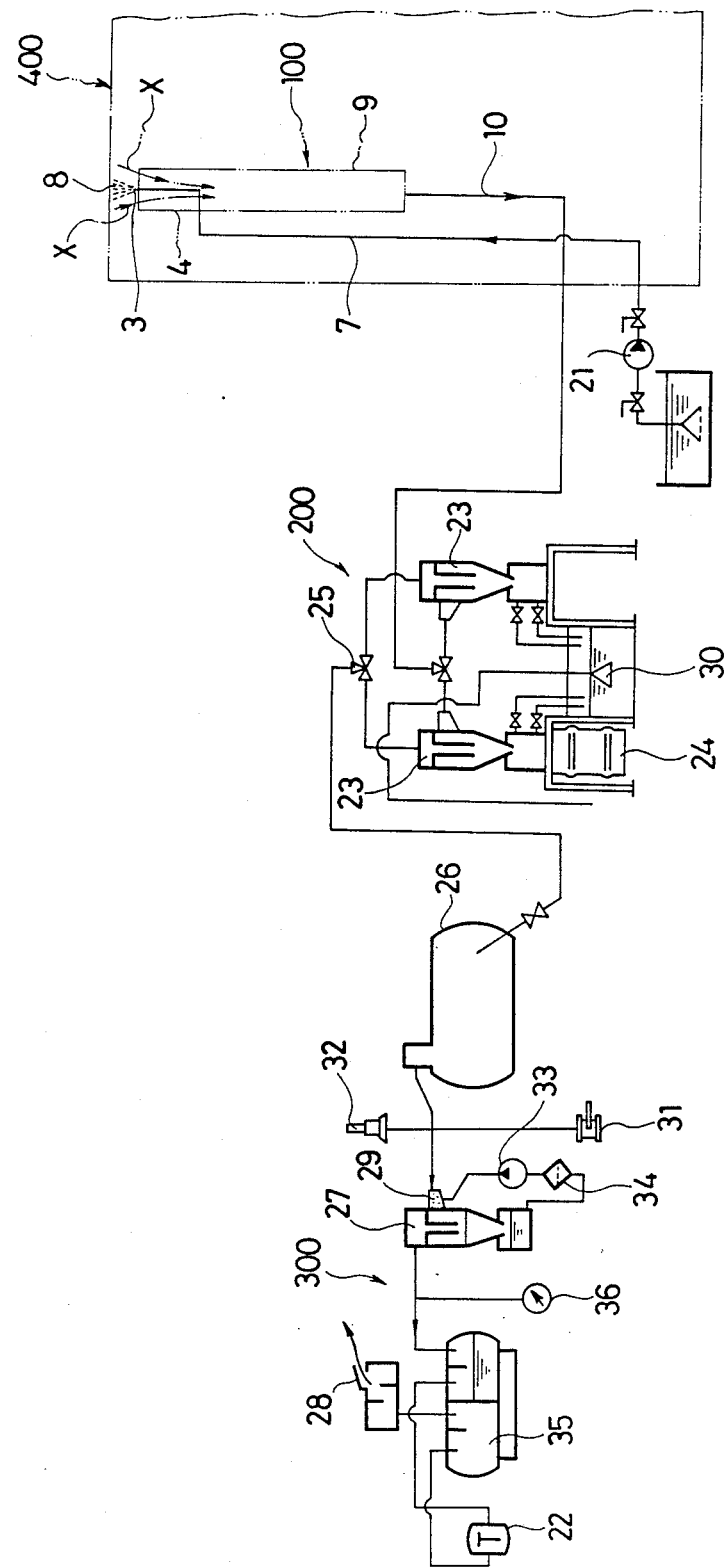
FIG. 4 is a flow chart for practicing the process of this invention.

One way of practicing the process of this invention is now described with reference to FIG. 4. Small fragments of an asbestos-filled lining or coating, which have been removed from a wall surface in the above-described matter, water and drawn air X are then fed to one of the cyclones 23 of the first dust collector 200. The fragments of the asbestos-filled lining or coating and water are mostly separated by said one of the cyclones 23. The fragments are then separated from the water and collected in a dust-collecting drum 24. On the other hand, the air from which a great majority of the fragments has been separated off is fed to a receiver tank 26 of the second dust collector 300 by way of a three port connection valve 25. It is then fed to a cyclone 27, in which any minute particles still remaining in the air are wet with water spray 29 and separated off. The resultant clean air is fed through a separator/drain tank 35 and a discharge silencer 28, and is thereafter released into the atmosphere.

Figure 7:
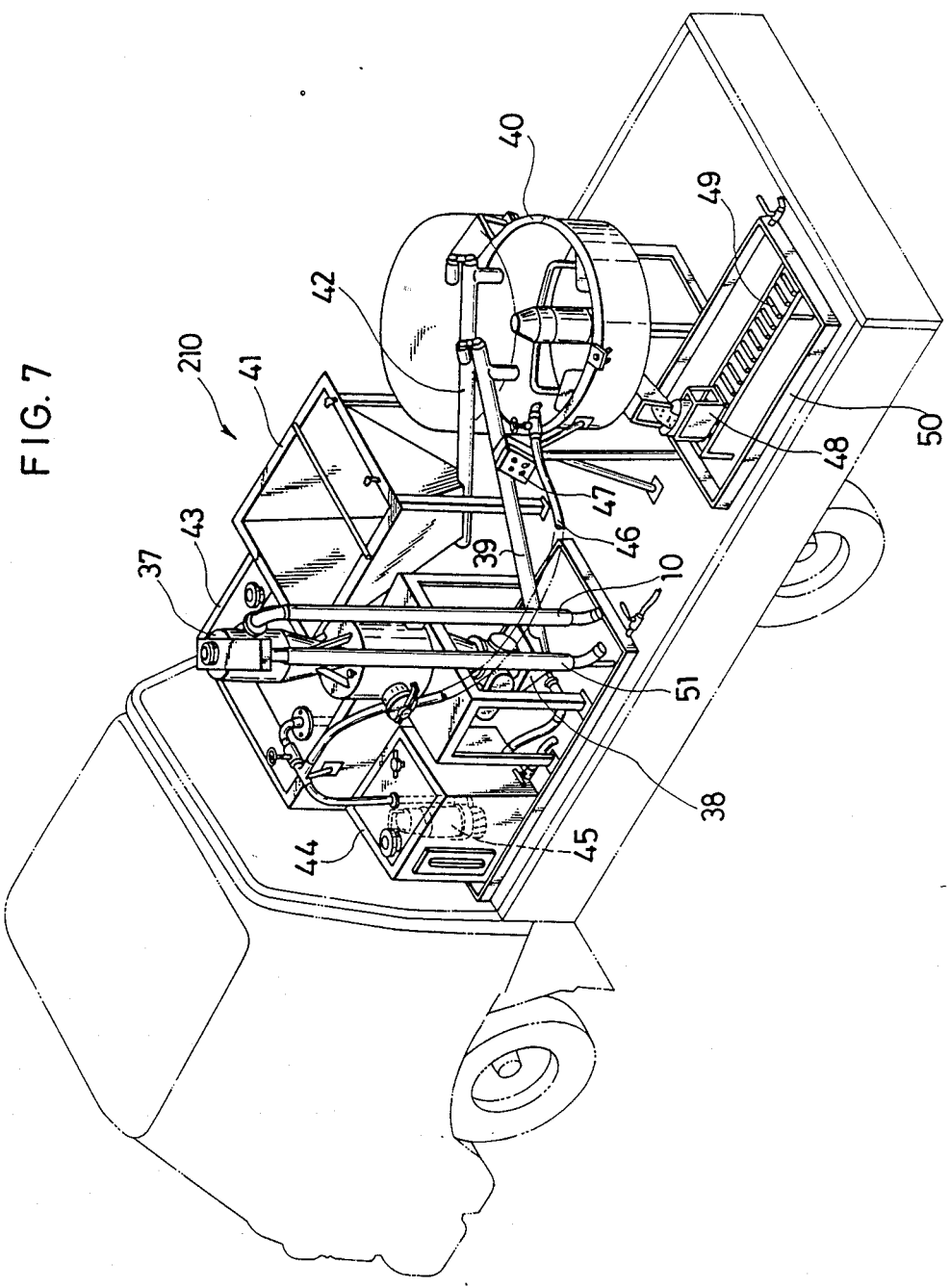
FIG. 7 is a perspective view of a cement-solidifying apparatus, which is useful for practicing the process of this invention in a manner different from that illustrated in FIG. 4.

In the above described-embodiments, the collected fragments of the asbestos-filled linings or coatings are collected in the dust-collecting drum 24. In another way of practicing the process of this invention, the collected fragments are solidified with cement in order to ensure the prevention of the environmental pollution as illustrated in FIG. 7. Small fragments of an asbestos-filled lining or coating, which have been removed from a wall surface in the above-described matter, water and drawn air X are then fed to a cyclone 37 of a first dust collecting and solidifying unit 210 through the flexible hose 10. The fragments of the asbestos-filled lining or coating and water are mostly separated there. The air is fed to a second dust collector 300 through a hose 51. Water is separated further from the fragments and water through a lower part of the cyclone 37. The fragments whose water content has been reduced are then charged into an air-tight cement mixer 40 by way of a recovered asbestos receiver 38 connected to the bottom of the cyclone 37 and a screw conveyor 39. Cement powder such as portland cement is fed to the cement mixer 40 from a cement hopper 41 via a screw conveyor 42 connected to the bottom of the cement hopper 41. On the other hand, a predetermined amount of water is supplied through a hose 46 from a first water tank 44, which receives water from a second water tank 43, by means of a submergible pump 45 arranged in the first water tank 44. The water is mixed with the cement and fragments in the cement mixer which is operated through a control panel 47. The resulting mixture is then filled in suitable containers or bags 48, transported out of the disposal system by means of a roller conveyor 49, and is allowed to solidify further for its disposal. Water which drips from the cement mixer 40 is collected in a catch pan 50 and is disposed separately.

The first dust collector 200 or first dust collecting and solidifying unit 210 employed above may be of any one of various dust collectors or dust collecting and solidifying units used in various fields and no particular limitation is imposed thereon. It is however preferable to provide two dust collectors or two dust collecting and solidifying units in a pair and then to use them alternately, because the work can be performed continuously. In addition, the second dust collector 300 may also be a conventional dust collector and no particular limitation is imposed thereon either.

Preferably, these dust collectors or dust collecting and solidifying units may be arranged systematically and mounted on a truck or the like, whereby they can be transported from one workplace to another. This arrangement is illustrated in FIG. 7 by way of example.

Since asbestos-filled linings or coatings are removed as described above in the present invention, the workers and surrounding environment are not polluted. An access unit such as that illustrated in FIG. 5 may also be provided to ensure the protection of the workers and surrounding environment from the hazardous substance. When the workers walk out of a work area 400, fragments of an asbestos-filled lining or coating, which have stuck on the workers, can be removed completely so that the prevention of the environmental pollution can be ensured.

Figure 5:
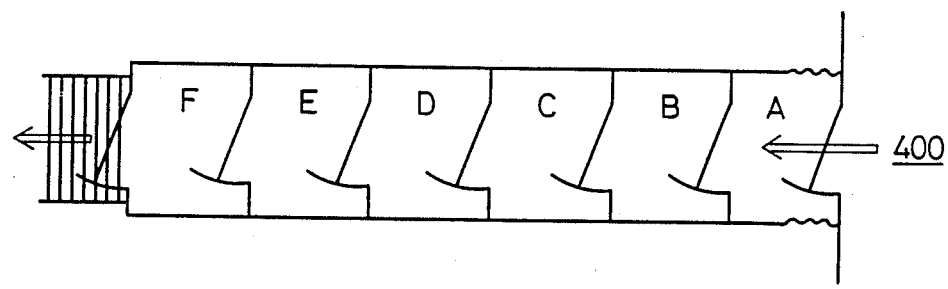
FIG. 5 is a simplified schematic illustration of the structure of an access unit.

In the access unit shown in FIG. 5, a walkway C provided with an air shower room B and warm-water shower room D is connected via a flexible duct A to an access opening of a building as the work area 400. Each worker who has walked out of the work area 400 enters first of all the air shower room B, in which asbestos dust stuck on his body is removed by air shower. He then enters the warm-water shower room D, in which he is washed with warm water. He then moves to a change room E and finally walks out through an exit F. In this manner, asbestos dust stuck on him can be removed completely. Such an access unit may preferably be mounted on a trailer or truck so that it can be transported from one workplace to another as needed.

Figure 6:
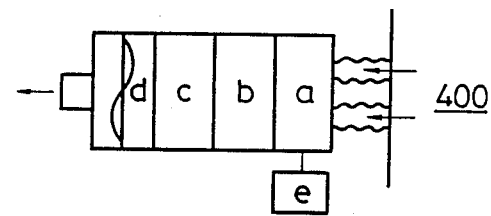
FIG. 6 is a simplified schematic illustration of a ventilation device.

In order to achieve sufficient ventilation of a work area and also to slightly reduce the pressure of the work area to prevent the air from flowing out from the work area to the outside, an air filter such as that depicted in FIG. 6 may be provided with a window or the like of the work area. For example, by connecting an automatic air filter a having a vacuum cleaner e, a medium-efficiency filter b, a high-efficiency filter c and a blower d in series, the interior air of the work area can be ventilated without allowing dust, which is contained at a low level in the air of the work area, to flow out to the outside.

It is also desirable to apply weather strips to openings and crevices around all windows and access openings of a building so that the work area can be isolated completely from the surrounding atmosphere. Use of such weather strips may lead to an increase in the temperature of the atmosphere of the work area. It may therefore be preferable to perform the removal work by using a cool air blower.

I claim:

1. A process for the removal of an asbestos-filled lining or coating applied on a surface of a building, which comprises:
    jetting out water at a pressure of 50–200 atm against an area of the lining or coating and at the same time mechanically rubbing said area of the lining or coating, thereby separating the lining or coating as fragments from said area of said lining or coating;
    drawing the fragments and water in said area of said lining or coating together with the surrounding air; and
    collecting the thus-drawn fragments by means of a dust collector.

2. The process as claimed in claim 1, which comprises constructing a worker's walkway as an access to a work area inside a building, and cleaning each worker as said worker departs from the building.

3. The process as claimed in claim 1, which comprises solidifying the thus-collected fragments with cement.

* * * * *